Feb. 4, 1964
J. K. SHANNON
3,120,572
METHOD OF MAKING A ONE-PIECE MOLDED BATTERY COVER
Filed Aug. 18, 1960
2 Sheets-Sheet 1
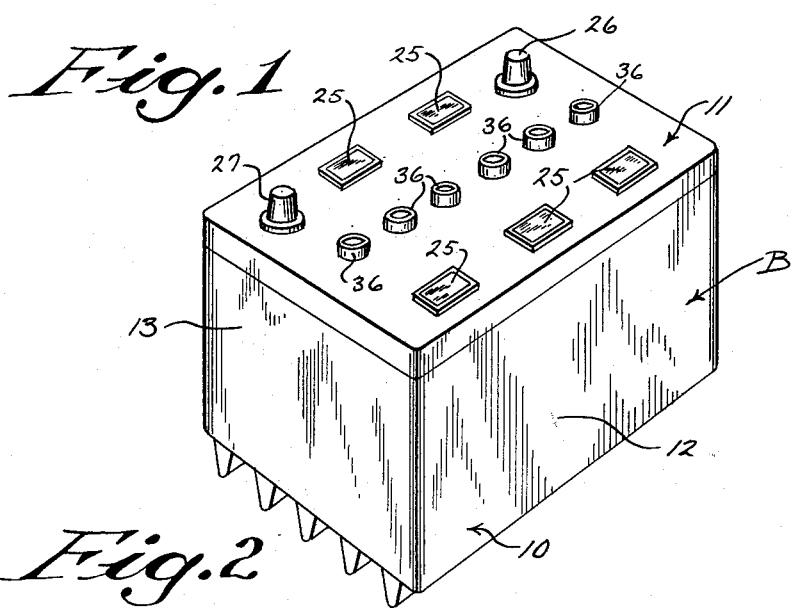
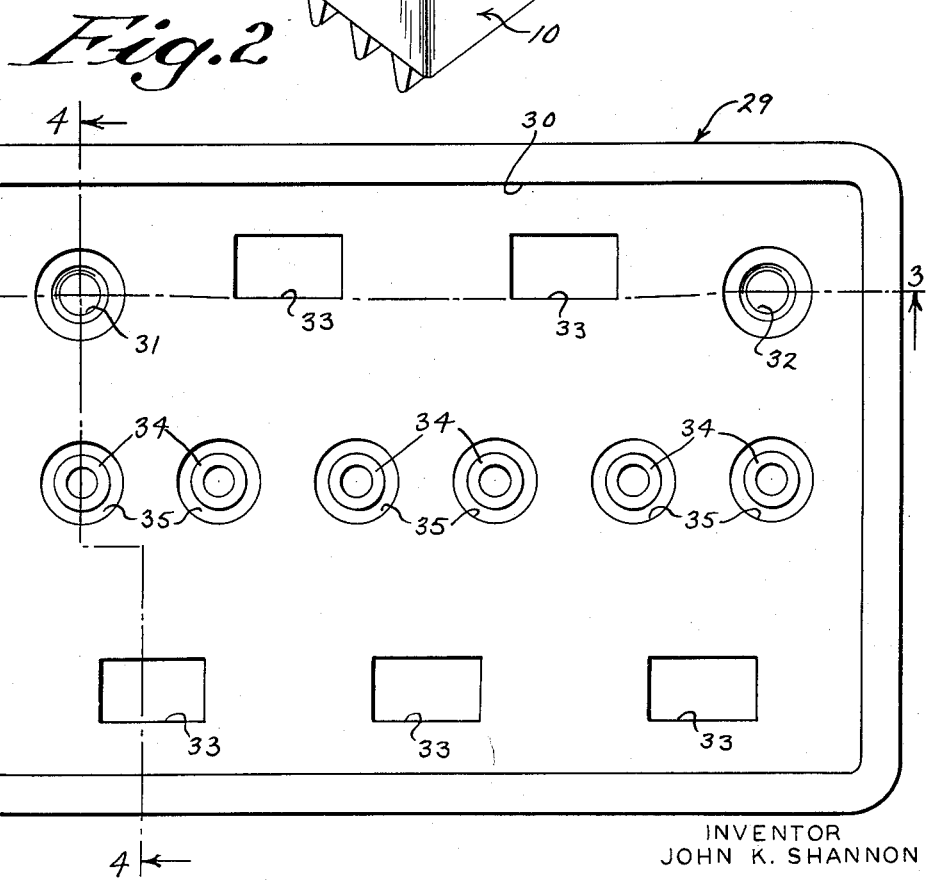
INVENTOR
JOHN K. SHANNON
BY
*Wright & Wright*
ATTORNEYS

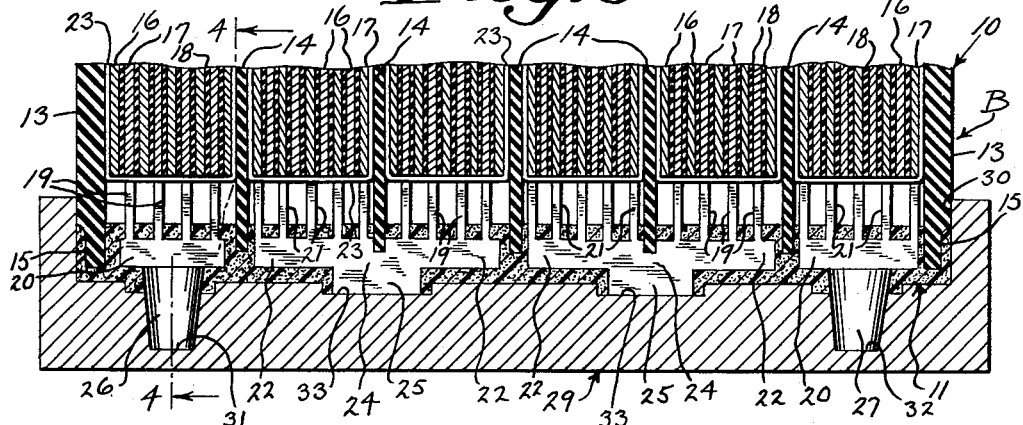
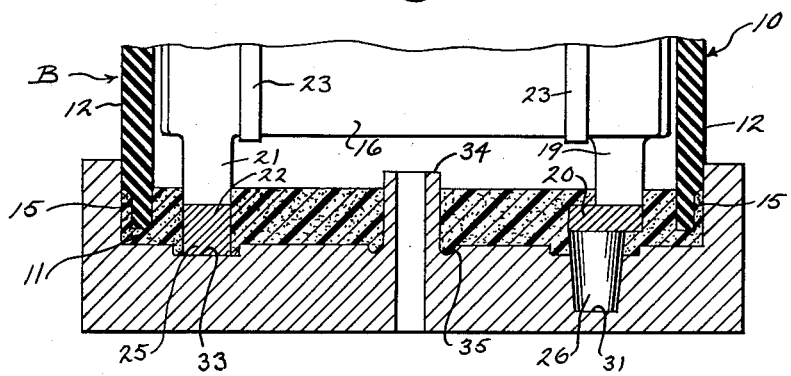
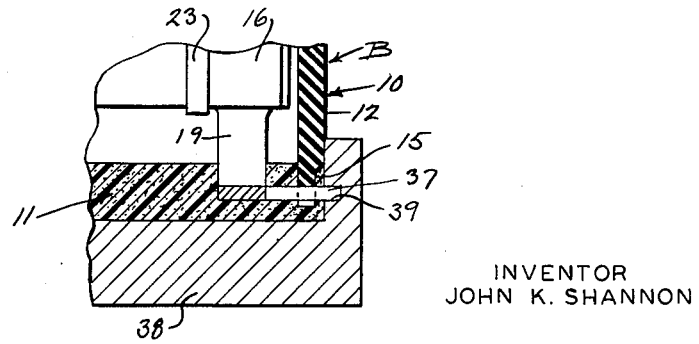
INVENTOR
JOHN K. SHANNON
ATTORNEYS

United States Patent Office 3,120,572
Patented Feb. 4, 1964

3,120,572
METHOD OF MAKING A ONE-PIECE
MOLDED BATTERY COVER
John K. Shannon, 2028 63rd Place, Kenosha, Wis.
Filed Aug. 18, 1960, Ser. No. 50,443
3 Claims. (Cl. 264—261)

This invention appertains to storage batteries and more particularly to a novel method and means for forming and uniting storage battery covers with battery cases to form a substantially integral one-piece unit.

Normally, a hard rubber or plastic part is molded as a separate piece to fit into or over the edges of the battery cell case or container. A groove is usually provided between the cover and the case or container wherein a thermoplastic or thermosetting sealant is applied which secures the cover to the case or container and prevents leakage of the electrolyte. Normally, the cover section of each cell is provided with a vent well, neck or filling opening which has been molded into the cover part and such openings have threads or other means for securing vent caps or closures in place. The plate lug necks are made below the inner face of the cover and the necks are usually enveloped by the electrolyte and the gases of the cells.

One of the primary objects of my invention is the provision of a novel method for molding a cover from plastic material (rubber, polyethylene, an epoxy resin etc.), directly on the battery case to form an integral part thereof and thereby insure the proper protecting of the battery plates and the prevention of the seeping of the liquid between the cover and the case and the elimination of the use of a sealant.

Another salient object of the invention is the provision of a method, whereby the connectors or jump straps for the cells and the shoulders or connectors for the lugs of the plate sets can be all embedded in the cover during the molding thereof and the forming thereof on the battery case, whereby such straps, shoulders and connectors will be effectively insulated and protected from any deleterious action of the battery acid and battery gases thereon.

A further object of the invention is the provision of a method utilizing means in the mold for the cover for receiving the terminal posts and parts of the jump or connector straps for the cells so that the cell plates will be properly supported by the mold during the pouring of the plastic material in the mold, and whereby the terminal posts will project their proper distances from the cover after the molding thereof.

A further important object of my invention is the provision of a novel method for enclosing and protecting the connector straps, shoulders etc. of battery plates and cells during the molding of a cover directly on a battery case which consists in first, placing a mold on a flat surface of a predetermined shape and form; second, properly positioning the cell plates in the mold with the terminal posts in the mold recesses; third, pouring the desired amount of plastic material in the mold to a certain level for covering and enveloping the plate lug shoulders or connectors and the cell connector or jump straps; fourth, sliding a pre-molded battery case in an inverted position over the plates and into the plastic cover material and finally, allowing the plastic cover material to solidify and join the edges of the battery case and then stripping the mold therefrom.

A still further important object of the invention is the provision of a method utilizing means on the mold for forming the vent openings and filling necks for the cells, with the said means forming escape passageways for any gases generated in the battery case during the molding of the cover on the battery case.

With these and other objects in view, the invention consists in the novel construction, formation and arrangement of parts, as will be hereinafter more specifically described and claimed, and illustrated in the accompanying drawings, in which drawings, FIGURE 1 is a perspective view of a storage battery constructed in accordance with this invention;

FIGURE 2 is a top plan view of one preferred type of mold utilized in the forming of the cover, the view being taken on a larger scale than FIGURE 1;

FIGURE 3 is a fragmentary longitudinal sectional view through a storage battery and the mold during the forming of the cover, the section being indicated on the line 3—3 of FIGURE 2, looking in the direction of the arrows;

FIGURE 4 is a fragmentary transverse sectional view through a battery and the mold showing the forming of the cover on the battery case, the section being indicated on the lines 4—4 of FIGURES 2 and 3, and FIGURE 5 is a fragmentary detail sectional view showing a portion of a battery and mold, the battery and mold being of the type for receiving laterally projecting terminal posts.

Referring to the drawings in detail, wherein similar reference characters designate corresponding parts throughout the several views, the letter B generally indicates a storage battery embodying the novel features of the invention. As illustrated, the storage battery B includes a pre-molded case or container 10 having molded thereon a cover 11.

The battery case 10 can be molded from hard rubber or any other preferred type of plastic material and is substantially of the same type and character as now employed in storage batteries on the market. Thus, the case 10 includes side walls 12 and end walls 13. The side walls 12 are connected by transversely extending partition walls 14 which form the individual battery cells. As illustrated a six cell battery has been indicated, but it is to be understood that more or less cells can be employed. While I have stated that the case 10 is of substantially the same character as employed in storage batteries now on the market and in general use, it is to be understood that the upper edges of the side and end walls 12 and 13 are formed in such a way as to insure the proper molding of the cover 11 thereon so that the cover and case will be correctly united to form a substantially homogeneous unit. Thus, the outer edges of the side and end walls 12 and 13 are reduced in thickness to provide a peripheral groove or seat 15. While I have shown this seat 15 formed exteriorly of the case, it is to be understood that the seat could be formed on the inner faces of the side and end walls.

Each cell of the battery B receives a set of positive and negative plates indicated by the reference characters 16 and 17. As is customary, the sets of plates 16 and 17 are held in a proper spaced position by separators 18. The plates of the negative set 17 have their lugs 19 joined by shoulders or connectors 20. The set of positive plates 16 have their lugs 21 joined by shoulders or connectors 22. The sets of plates and separators are preferably bound together by a band 23. The positive set of plates of one cell are electrically connected to the negative set of plates of an adjacent cell by jump or connector straps 24. These jump or connector straps 24 are preferably, but not necessarily, formed with boses 25, for a purpose, which will be later set forth, but it is to be noted that where these boses are utilized the same form test points for cells, and this is best shown in FIGURE 1. The end cells of the battery are provided with terminal posts 26 and 27, and as best shown in FIGURE 3 of the drawings, the terminal post 26 is carried by and electrically connected with a negative set of plates, while the terminal post 27 is carried by and electrically connected with a positive set of plates. The terminal posts 26 and 27 project a material distance beyond the outer edges of the walls of the case.

In order to bring about the molding of the cover 11 on the battery case and the enveloping of plate lug shoulders, connectors and jump straps by plastic material, I employ a mold of proper dimensions according to the size of the battery being made. The mold 29 can be made from various materials, such as metal, rubber or a desired plastic material, or combinations of materials. However, the material from which the mold 29 is made should not be compatible with the plastic material from which the cover 11 is molded, as obviously, the cover when molded must be readily stripped from the mold.

As illustrated, the mold is in the nature of a flat plate having its upper face provided with a main mold cavity 30 of an exact size for receiving the upper edges of the side and end walls of the battery case. When the case is associated with the mold the same is placed in an inverted position, as is best shown in FIGURES 3 and 4. In view of the forming of the groove 15 in the side and end walls of the case, this part of the case is spaced from peripheral walls of the mold for a purpose, which will also later more fully be brought out. The main cavity 30 has formed therein at the correct points, terminal post cavities 31 and 32. The wall of the main cavity 30 also has preferably formed therein seats 33 for receiving the test portions 25 of the jump or connector straps. The lower wall of the main cavity 30 also has formed thereon upstanding equidistantly spaced necks 34 and these necks at their bases are surrounded by annular grooves 35. The necks 34 form the means for molding vent openings in the cover during the molding thereof for the cells and the grooves 35 provide vent opening rims 36.

After the battery is formed, caps are provided for the vent openings.

With the cell plates, lugs, shoulders, connector straps and terminal posts properly formed, the forming of the battery cover 11 can be proceeded with and the cell plates are arranged in their proper order within and on the mold cavity 30. The terminal posts 26 and 27 are placed in their cavities 31 and 32 and the enlargements on the jump straps for the cells 25 are placed in their seats 33. These portions 25 and the terminal posts 26 and 27 effectively support the plates in the mold. The plastic material from which the cover 11 is made is now poured into the mold cavity to the desired level. This level can be sufficient to completely cover, enclose and envelop the plate lug shoulders, and connector straps for the cells, with the exception of the outer faces of the enlargements 25 which rest against the lower walls of the seats 33. The plastic material from which the cover can be made, by way of example, can be hard rubber, polyethylene, an epoxy resin, or the like, and is preferably of a material which is compatible with the material from which the battery case 10 is made, so that the cover and the battery case will form substantially one homogeneous part.

With the plastic poured into the mold cavity to a desired level, the battery case 10 is now inverted and inserted into the mold cavity with the edges of its walls forced into the plastic, and this plastic will flow around and into the groove or reduced portion 15 of the case walls. When the cover material solidifies, the mold 29 can be stripped off of the same and the battery, as shown in FIGURE 1, will be formed.

Where the plastic is poured into the mold at a level below the lug shoulders or cell connector straps, the mold can be rocked back and forth to splash the plastic on the lug shoulders and connector straps to coat the same and adjacent battery case wall parts.

I lay great stress on the necks 34 carried by the mold as these necks not only form the vent openings for the cells but also provide escapes for air and any gases generated by the plastic. In fact, these openings can be used with suitable appliances for withdrawing air by a vacuum.

In FIGURE 5 I have illustrated a slightly modified form of the invention, and in this form the storage battery is provided with laterally extending terminal posts 37. Where covers are being united with batteries having laterally extending terminal posts 37, I provide a mold 38 and the side wall of the mold is provided with a cavity 39 for receiving the posts. With this type of battery the mold should be formed from flexible material so that the mold can be sprung back over the posts 37 when the mold is stripped from the battery.

From the foregoing description, it can be seen that I have provided a novel means and method for molding a one-piece cover directly on a battery case and in such a manner that plate lug shoulders, cell connector straps etc. can be completely embedded within the cover.

Changes in details may be made without departing from the spirit or the scope of this invention, but what I claim as new is:

1. The method of forming and molding a battery cover onto a battery case of the type having partition walls defining cell compartments for cell plate groups, which comprises in, first, providing a mold having a main cavity in its upper face with the inner wall of the cavity having supplemental cavities for terminal posts of certain cell plate groups; second, placing cell plate groups in an inverted position in the main cavity with the terminal posts in the supplemental cavities; third, placing plastic in a free flowing state to a predetermined level in the main mold cavity and over portions of cell plate groups and terminal posts; fourth, inverting the battery case and slipping the same over the battery plates and immersing the outer edge of the case including the partition walls in the plastic material; fifth, allowing the plastic to solidify, and finally, stripping the mold from the formed cover molded on the case.

2. The method of forming and molding a battery cover onto a battery case of the type having partition walls defining cell compartments for cell plate groups as defined in claim 1, and said mold having formed on its inner wall spaced upwardly extending hollow vent necks, the plastic in its free flowing state surrounding the necks to a predetermined level to provide vent and filling openings in the molded cover for cells upon the stripping of the mold from the solidified cover.

3. The method of forming and molding a battery cover over and around the upper edges of a battery case and for enveloping battery plate connectors and connector straps in the material from which the cover is made, which comprises in employing a mold having a main cavity in its upper face of a size for receiving the edges of the case with the inner wall of the main cavity having supplemental cavities for battery terminal posts and connector straps; second, positioning cell plate groups and their straps and posts in an inverted position in the main cavity of the mold with the terminal posts and connector straps in the supplemental cavities; third, placing plastic material in a free flowing state in the main mold cavity to a level for enveloping the battery plate connectors and connector cell straps and portions of the terminal posts; fourth, inverting the battery case and slipping the same over the battery plate cell groups and immersing the outer edge of the case in the plastic material; fifth, rocking the mold and battery case to splash the plastic material over adjacent parts of cell plate groups and battery case wall parts; sixth, allowing the plastic material to solidify around the case, and finally, stripping the mold from the cover and case.

References Cited in the file of this patent
UNITED STATES PATENTS

| | | |
|---|---|---|
| 2,078,892 | McCullough | Apr. 27, 1937 |
| 2,556,148 | Schaefer | June 5, 1951 |
| 2,692,906 | Morgan | Oct. 26, 1954 |
| 2,773,927 | Yeoman | Dec. 11, 1956 |
| 2,873,482 | Bridge et al. | Feb. 17, 1959 |